United States Patent [19]

Walker et al.

[11] 4,303,472
[45] Dec. 1, 1981

[54] FILTER ELEMENTS FOR GAS OR LIQUID AND METHODS OF MAKING SUCH FILTERS

[75] Inventors: Brian Walker, Washington; Kenneth Merrie, High Shincliffe, both of England

[73] Assignee: Process Scientific Innovations Limited, Durham, England

[21] Appl. No.: 3,450

[22] Filed: Jan. 15, 1979

[30] Foreign Application Priority Data

Jan. 23, 1978 [GB] United Kingdom ............... 2559/78

[51] Int. Cl.³ .............................................. D21J 7/00
[52] U.S. Cl. ................................... 162/221; 162/219; 162/227; 162/230
[58] Field of Search ............... 162/218, 219, 221, 228, 162/164 R, 207, 152, 156, 145, 230, 131, 224; 210/491, 493 B, 487, 508, 505, 509; 55/527; 264/86, 87

[56] References Cited

U.S. PATENT DOCUMENTS

| | | | |
|---|---|---|---|
| 804,432 | 11/1905 | Rivers | 162/218 |
| 1,527,157 | 2/1925 | Drake | 162/218 |
| 1,549,903 | 8/1925 | Buel | 162/218 |
| 2,395,301 | 2/1946 | Sloan | 162/219 |
| 3,028,911 | 4/1962 | Lear | 162/228 |
| 3,573,158 | 3/1971 | Pall et al. | 162/156 |
| 4,006,054 | 2/1977 | Head | 162/156 |
| 4,032,457 | 6/1977 | Matchett | 210/505 |
| 4,078,965 | 3/1978 | Berger et al. | 162/219 |
| 4,196,027 | 4/1980 | Walker et al. | 210/508 |

FOREIGN PATENT DOCUMENTS 58601 11/1937 Norway ............................. 162/230

Primary Examiner—Peter Chin
Attorney, Agent, or Firm—Pollock, Vande Sande & Priddy

[57] ABSTRACT

Tubular filter elements are formed by first feeding a slurry into a tubular moulding space between a vertical core and a cylindrical fine mesh screen. Air pressure is applied to the slurry so that the liquid drains through the screen and through a screen at one base of the space, while a mass of microfibres builds up to be removed from the space for bonding by a synthetic resin. A reciprocable sleeve increases the effective height of the screen as the mass builds up. Layers of microfibres having different qualities can be assembled by using different core diameters in succession. Filter elements that need not necessarily be cylindrical can be formed by this or analogous pressure methods in which the majority of the microfibres are directed approximately parallel to one another, and/or in which one or each face of the filter element has moulded into it a perforated sheet of supporting material.

15 Claims, 18 Drawing Figures

FILTER ELEMENTS FOR GAS OR LIQUID AND METHODS OF MAKING SUCH FILTERS

This invention relates to filter elements and to methods and apparatus for filter elements.

In U.S. Pat. No. 4,111,815 there is described a method of forming a filter element which comprises dispersing a mass of fibres in a liquid to form a slurry, draining the liquid through a filter surface on which the fibres collect while an apertured sheet of supporting material is located at a selected distance above the filter surface, so that the fibres build up from the filter surface through the apertures in the supporting material to a predetermined distance above the supporting material, removing the collected fibres containing the sheet of supporting material from the filter surface, and bonding the fibres to one another and to the supporting material by means of a synthetic resin.

One aspect of the present invention is based on further experiments that demonstrate unexpectedly satisfactory results if, in the aforesaid method, the sheet of supporting material is omitted or, if provided, is located substantially in contact with the filter surface so that the sheet of supporting material becomes moulded into one surface of the filter element. The invention results in the production of a particularly efficient fibrous filter that is very economical to manufacture.

According to the present invention, a method of forming a filter element comprises dispersing a mass of fibres in a liquid to form a slurry, applying the dispersion under pressure to a filter surface so that the fibres collect as a layer covering the filter surface while the liquid passes through the filter surface, and bonding the fibres in the collected mass of fibres, after drying, to one another by means of a synthetic resin. A sheet of material that is to provide a support for the filter element may be mounted in contact with at least a portion of the filter surface so that the support sheet becomes moulded into one surface of the collected mass of fibres. Thus, when the support sheet, which may be provided by very fine mesh material, is removed, the fibres are found to have penetrated through the support sheet leaving their outer surface flush with the outer surface of the support sheet, which may be a layer of expanded metal. In the past, in the case of cylindrical filter elements, these have required the addition of a separate support sheet to give strength, but the present moulding method enables the filter cylinder and support sheet to be produced as an integral part in one operation with precision, saving time and labor.

In general, it is desirable to make the apertures and open area of the support sheet as large as possible. However, it is difficult to specify the largest aperture that can be used. The smallest aperture at present contemplated is 0.25 mm diameter. However, it must be remembered that certain fibres, such as potassium polytitanate, e.g., potassium dititanate, have a diameter of 0.5 microns and length of up to 0.15 mm and these can penetrate apertures of 0.25 mm and smaller.

In the case of the filter surface, expanded metal with narrow flat strips between overlapping elongated apertures, an aperture size of 0.75 mm by 0.5 mm has been found to be practical. This gives a good surface finish. 1 mm by 0.75 mm will of course give a somewhat rougher finish.

Other practical examples or rigid supports have had apertures of 2.8 mm by 0.8 mm providing an open area of 26% of the area of the support sheet, and 43 mm by 20 mm with an open area of 83%. In general it has been found that the support sheet results in a very small flow restriction, of the order of 1% to 2% of the total flow.

In a modification of the aforesaid method, the support sheet consists of a rigid foam or sintered material thereby eliminating the necessity for the use of the very fine mesh material in the production of the filter element.

When, as in the aforesaid prior U.S. Pat. No. 4,111,815, the binder is used not only to bond the fibres together but also to the support sheet, this may be, for example, silicone, polyurethane, expoxy or phenolic resin. Heat cured resins are preferred though air drying resins can be used. The weight of the resin binder depends on the strength required. Generally the weight of the binder is no more than 100% of the weight of the fibres.

It has been found that the use of pressure in the method according to the invention results in a majority of the fibres being disposed so that they are directed, in some measure, approximately in parallel with one another. This gives particularly advantageous results, whether or not a support sheet is used. According to a further aspect of the invention, therefore, a filter element comprises a mass of fibres compacted together and bonded to one another with a synthetic resin, a majority of the fibres being disposed so that they are directed, in some measure, approximately in parallel with one another.

In order that the invention may be clearly understood and readily carried into effect, examples of the invention will now be described with reference to the accompanying drawings, in which.

Figure 1:
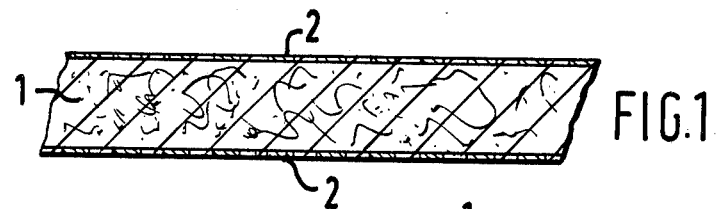
FIG. 1 is a sectional elevation of part of a filter element.
Figure 2:
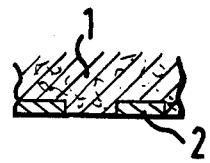
FIG. 2 is an enlargement of a portion of FIG. 1.
Figure 7:
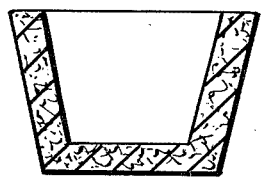
FIG. 7 is a sectional elevation of a further filter element.
Figure 8:
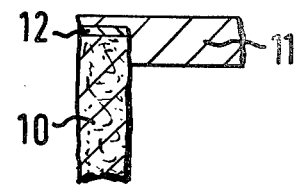
FIGS. 8 to 18 show portions of various sealing arrangements for the ends of filter elements.
Figure 9:
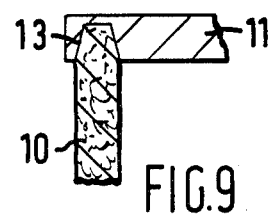
Figure 14:
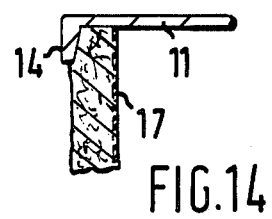
Figure 10:
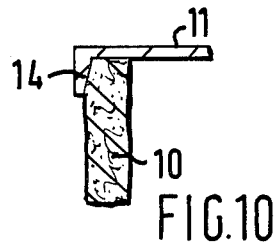
Figure 15:
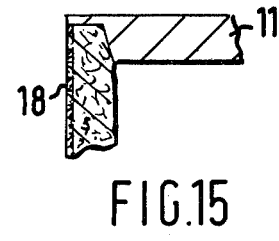
Figure 11:
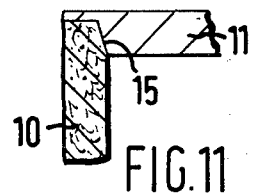
Figure 16:
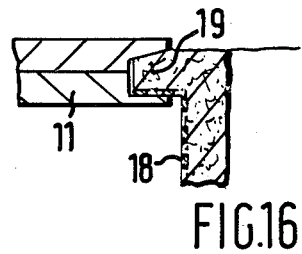

The portion of the filter element shown in FIGS. 1 and 2 may be part of the wall of a cylindrical filter element although it can equally well be regarded as part of a disc, sheet or conical or frusto conical cylindrical shape (for example closed at one end as shown in FIG. 7). A similar method may also be used for the production of concave or convex discs. The bulk 1 of the filter element comprises fibre material; for example, glass, ceramic, synthetic fibres, asbestos, mineral wool, organic or silicate fibres. Raw borosilicate microfibre is a preferred material. For cartridge type filters to be used in liquid filtration, cellulose, wool, synthetic polymer (e.g. polypropylene and acrylic) fibres, and combinations of these, also such combinations containing a portion of borosilicate microfibre, can very advantageously be used. These combinations can also be used for gas filtration. Both faces of the fibre mass 1 have an apertured support sheet 2 moulded thereto so that the fibrous mass penetrates through the apertures in the sheets to present surfaces that are flush with the outer surfaces of the sheets (FIG. 2). Each support sheet consists of an apertured or open pore rigid material such as a perforated, expanded or woven material which, in turn, may be of metal, plastics, glass or ceramic. Expanded metal is a preferred material. The total area of the openings in the support sheets depends on the use to which the filter element is to be used.

Figure 3:
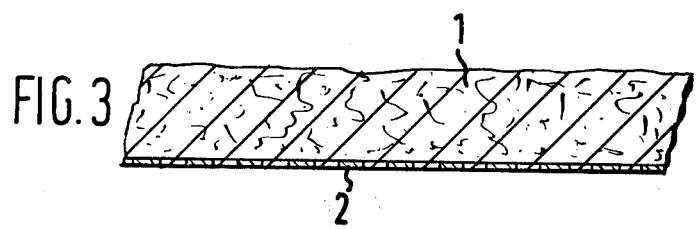
FIG. 3 is a sectional elevation of part of another filter element.

The filter element of FIG. 3 is similar to that of FIG. 2, but only one support sheet 2 is used. Where one support sheet is used, this is generally located on the downstream side of the fibres. This not only gives strength where it is required but does not reduce the inlet surface area of the filter, thereby increasing the dirt holding capacity. For low pressure use as for example in vacuum systems, the support sheet can be of comparatively light construction but, when used in a high pressure system, either with gas or liquid, the support sheet can be of heavier construction.

In a further example, no support sheet is used. This example consists of a tube made from raw borosilicate microfibre moulded by pressure forming into the cylindrical shape by a method as described below with reference to FIGS. 4 to 6. The moulded tube is then dipped into a solution of resin in a solvent so as to impregnate the fibrous material and is then heat cured. By using a method as described below a filter element without any support sheet can be constructed with very advantageous properties. For example such filter elements 54 mm long, 44 mm outside diameter and 34 mm inside diameter have been constructed and tested to give the following characteristics:

| D.O.P. % | BURST bar | FLOW NM³/H | Δp bar | p bar | O.D.T. % w/w |
|---|---|---|---|---|---|
| >>99.999 | >7.0 | 45 | .069 | 7.0 | 15.0 |
| 99.97 | >7.0 | 45 | .069 | 3.0 | 27.0 |
| 99.90 | >7.0 | 48 | .035 | 3.0 | 25.0 |
| 99.80 | >7.0 | 52 | .035 | 3.0 | 21.0 |
| 99.80 | >7.0 | 50 | .035 | 4.0 | 35.0 |

In the above table p is the operating test pressure, Δp is the pressure loss across the filter below, and O.D.T. is the ratio of the oven dried total weight of resin to the fibre content of the filter element. The binder used in all the filter elements represented in the above table was a silicone resin, which is preferred, but many other binders can be used to give comparative test results. The highest resin content which is in the last tabulated example, is 35% but this can be raised to as high as 100% while still providing satisfactory characteristics. However, 25% has been found admirably satisfactory for most applications.

The effect on performance of varying the wall thickness of an unsupported tubular filter element is shown in the following table relating to a larger element 200 mm long, 66 mm outside diameter and 54 mm inside diameter for sample (a) but 46 mm inside diameter for sample (b):

| SAMPLE | D.O.P. % | FLOW NM³/H | Δp bar | p bar | O.D.T. % w/w |
|---|---|---|---|---|---|
| (a) | 99.99 | 306 | .017 | 4.2 | 16.0 |
| (b) | 99.999 | 170 | .017 | 4.2 | 16.0 |

In the above table the pressure p is a gauge pressure above atmospheric pressure while Δp, of course, is a pressure differential.

The above table shows that it is effectively only the flow capacity and efficiency that is affected by the increase in wall thickness. In practice, it is thought that about 3 mm will prove to be a lower limit for the wall thickness.

The good results, exemplified by the above tables, are believed to arise from the packing pattern of the fibres that arise as a result of a method of manufacture such as described below with reference to FIGS. 4 to 6. This packing pattern results from the fibres lying in some measure more uniformly in a circumferential direction around the filter element, than is possible with known vacuum methods which display a totally random packing pattern. The more regular packing in the filter elements of the invention does not detract from their efficiency.

Although the filter elements described immediately above have no rigid support sheet, they can be provided with an inner, outer, or both inner and outer layer of woven or non-woven flexible material to improve the handling characteristics. Such a layer can be incorporated during the manufacture of the filter element by a method as described below. The fibres would generally penetrate through an aperture or pore structure of the flexible material. Moreover in the case of a filter element with a single rigid suport sheet as shown in FIG. 3, the opposite face of the fibrous structure can be provided with a layer of flexible material.

Simple, unsupported tubular filter elements as described above may be formed with a variety of surface patterns, for example circumferential or longitudinal grooves, to increase the surface area.

Figure 4:
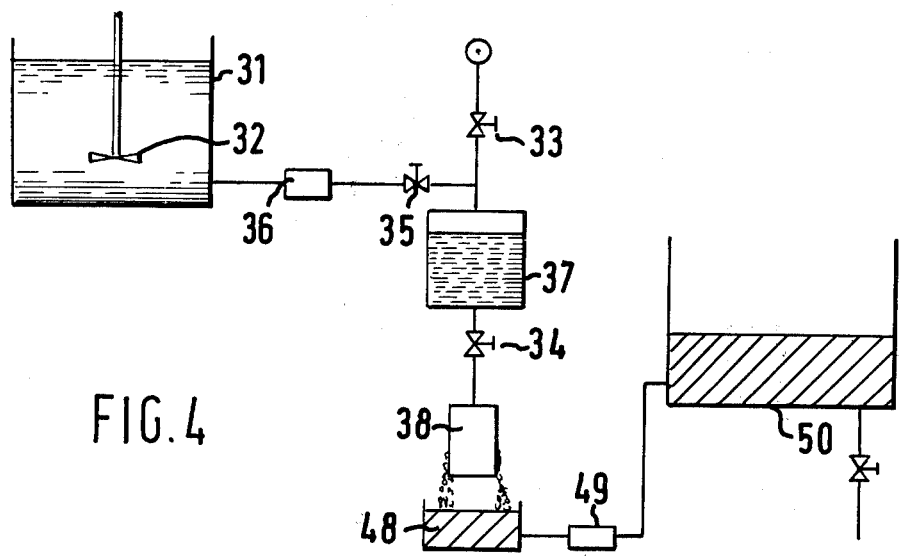
FIG. 4 is a diagram showing apparatus for manufacturing a filter element.

FIG. 4 shows diagrammatically apparatus for forming a tubular filter element. When this apparatus is in operation, water and borosilicate microfibres are fed into a blending tank 31. Hydrochloric or sulphuric acid is added until the pH value reaches 2.8 to 3.5. Borosilicate microfibres are found to disperse more readily at this value. It has also been found that the fibres disperse more readily if the solution temperature is increased to about 35° C. The quality of the fibres that are used depends on the grade of the filter element that is to be used. The fibre to water ratio (by weight) is generally 0.05% but can vary between 0.01% and 0.5%. A binder such as colloidal silica may be introduced into the slurry at this stage. It has been found advantageous to use this type of binder to impart additional strength prior to resin impregnation. The final dispersion is effected by a mechanical agitator 32 and takes about 15 minutes.

With valves 33 and 34 closed and valve 35 open, a pump 36 transfers the dispersion to a pressure vessel 37. The precise quantity transferred depends on the fibre/water ratio and the size of the filter element to be produced.

Next the valve 35 is closed and the valve 33 is opened to admit compressed air to the pressure vessel 37. Generally the pressure used is 3.5 bar. This top pressure is the forming pressure and can be varied according to the efficiency required. The efficiency can be varied within a range, e.g., 99.9% to 99.999%, using the same fibre blend. The forming pressure may be as low as 0.3 bar, but a pressure of 3.5 bar has been found highly satisfactory with the fibre blend adjusted to suit the required efficiency.

Figure 5:
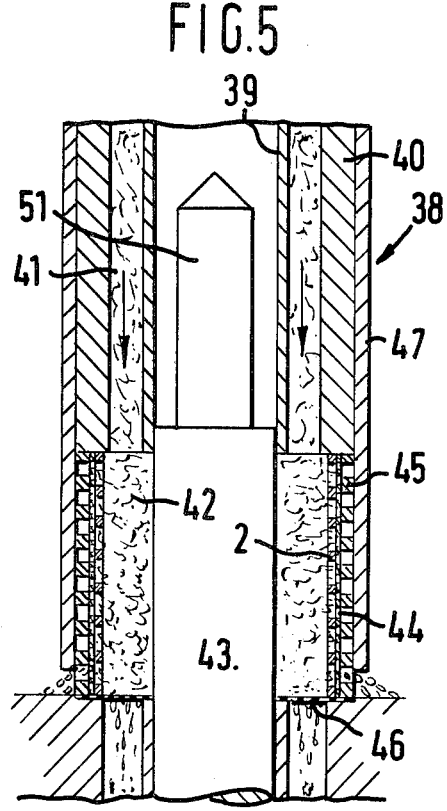
FIG. 5 is a sectional elevation of a detail of the apparatus of FIG. 4.
Figure 6:
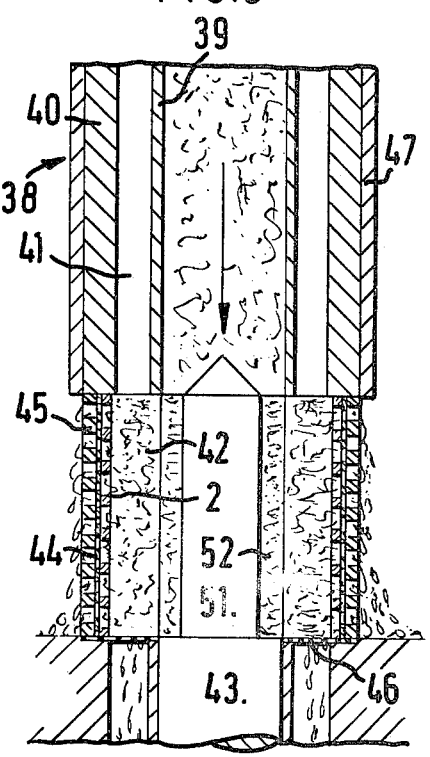
FIG. 6 is similar to FIG. 5 but relates to a different phase in the operation of the apparatus.

The next step is to open the valve 34 to enable the dispersion to flow into a moulding rig 38 shown in detail in FIGS. 5 and 6. The moulding rig includes inner and outer vertical cylinders 39, 40 defining a space 41 through which the dispersion can flow into a cylindrical moulding space 42 defined between a fine mesh screen 44, supported by a machined perforated cylinder 45, and a core 43 when in the position of FIG. 5. FIGS. 5 and 6 show the filter element being moulded as a unit with an outer rigid cylindrical support sheet 2, but it will be appreciated that for a simple borosilicate microfibre filter tube, this can be omitted. Alternatively, of course, an inner support sheet can be moulded into the inside surface of the tube, either instead of or as an addition to the outer sheet 2. The bottom of the moulding space is covered by a fine mesh screen 46. A reciprocable sleeve 47 is mounted to slide outside the cylinder 40 and perforated cylinder 45.

With the core 43 and sleeve 47 in the positions shown in FIG. 5, the water drains away through the screen 46 and lower end of the screen 44 into a tank 48 (FIG. 4) while the mass of fibres begin to build up in the moulding space 42. After all the fibres have accumulated in the moulding space, the air pressure is maintained so as to remove residual water from the fibres and so dry the formed filter. The valve 34 is then closed. During the moulding process, a pump 49 continuously pumps the water from the tank 48 to a holding tank 50 from which the water is recycled.

Finally the core 43 is removed to enable the formed filter element to be removed from the rig 38. The process can then be started once more. As an example, it has been found that the time taken to mould a tubular filter element 250 mm long, 65 mm outside diameter with a wall thickness of 10 mm takes approximately one minute. The formed filter element is removed to a hot air dryer for final drying and is then resin impregnated and oven cured to harden the resin.

Particularly in the case of long filter elements, e.g., over 50 mm, it has been found desirable progressively to raise the sleeve 47, substantially at the same rate that the height of the fibre mass increases, in order to maintain an uninterrupted flow of the dispersion to the point where the mass of fibres is building up. The movement of the sleeve 47 then terminates as shown in FIG. 6.

The core 43 is formed with an upper portion 51 of reduced diameter. This is to enable an additional internal layer of fibrous filter material to be added to the filter material formed in the moulding space 42, by feeding a further dispersion through the cylinder 39 into a moulding space 52 (FIG. 6) between the moulding space 42 and the core portion 51 when the core 43 is lowered. The water from the new layer escapes through the fibres in the space 42. The new layer may be of higher or lower efficiency than the tubular element formed in the space 42. This arrangement enables a filter element of graded density to be produced as part of an integral process.

Investigations have shown that the fibres in a finished filter element produced by the method described above with reference to FIGS. 4 to 6 are predominantly layered in planes perpendicular to the direction in which the dispersion flows into the moulding space. It has further been found that the same packing pattern arises throughout the range of forming pressures that can be used effectively in practice. Advantages of this packing pattern appear from the results tabulated above.

For some applications of the invention, where cellulose fibres or combinations of celluose fibres with borosilicate fibres are used, a melamine or phenolic resin binder may advantageously be used for the bonding material. Cellulose when bonded with melamine resin is approved as being suitable for potable water and sanitary conditions. Phenolic resin is preferred for higher temperature work. The combination of cellulose fibres with other fibres provides economies both in regard to cost and production time, good flow characteristics and chemical resistance, and controlled selection of pore size by blending different fibre materials with cellulose. It has been found that by blending 20% borosilicate microfibre with 80% cellulose by weight the production time for the filter can be reduced by 30%. In this case when the fluid is water the pressure drop ($\Delta p$) across the filter was 0.15 bar with a flow rate of 16 liters per minute. With a weight to weight ratio of 50%, $\Delta p$ was found to be 0.15 bar with a flow rate of 22 liters per minute. The glass fibre size (diameter) was 3.8 to 5.1 microns and the cellulose a bleached softwood kraft. The bonding material, e.g. melamine resin, phenolic resin or other synthetic resin, can be applied in one of three different ways. Firstly, by forming a mass of fibres in a moulding rig such as shown in FIGS. 5 and 6, then impregnating the mass after drying by dipping in a resin solution and curing the resin in an oven. Secondly, by preparing the cellulose fibre and separately mixing the borosilicate fibre with a resin solution, bringing the two mixtures together, forming the mass under pressure in the moulding rig and curing the mass. Thirdly, all the fibres and resin solution can be mixed in a single tank, passed to the moulding rig, the mass being subsequently cured.

A cylindrical filter element for liquid filtration having a combination of fibres as described above may have an outside diameter of 64 mm, a wall thickness of 18 mm and various lengths, such as 250 mm. No support sheet is necessary for many uses but can be added when necessary. The filter is preferably arranged for flow from outside to inside the cylinder to give greater surface area for collection of dirt. This area can be increased by forming longitudinal or circumferential grooves in the outside surface of the cylinder.

Instead of using a compressed gas to apply pressure to the slurry in the moulding rig, a hydraulic pump may be used, this pump being arranged to withdraw the slurry from the blending tank and force it into the moulding rig.

Tubular or cylindrical filter elements made in accordance with the invention may be mounted in a variety of filters, in particular those shown in FIGS. 5, 6, 7 and 13 in the aforesaid prior U.S. Pat. No. 4,111,815. As in that prior patent, also the ends of the cylindrical filter elements may be fitted into end caps in a variety of ways. Such ways are shown in FIGS. 8 to 17 of the present specification.

Figure 12:
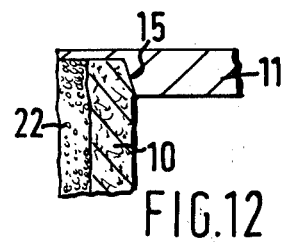
Figure 13:
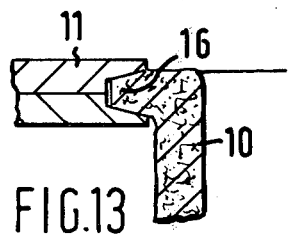

FIGS. 8 to 13 show cases where the end of a cylindrical, unsupported filter element 10 is fitted into an end cap 11 using a gasket seal 12 (FIG. 8), a double taper seal 13 (FIG. 9), an outside taper seal 14 (FIG. 10) an inside taper seal 15 (FIGS. 11 and 12) and a double taper flange seal 16 (FIG. 13). For a cylindrical filter element with an inside support sheet 17 an outside taper seal 14 (FIG. 14) may be used. For an outside support sheet 18 (FIG. 15) an inside taper seal 15, or a single taper flange seal 19 (FIG. 16) may be used. In the case of a filter element having inside and outside support sheets 20, 21

Figure 17:
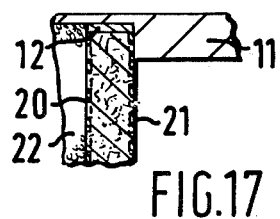
Figure 18:
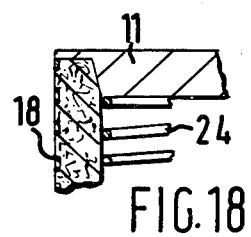

(FIG. 17) a gasket seal 12 (FIG. 17) can be used. In all forms of the filter element constructed according to the invention, an open pore filter layer or sleeve, as shown in FIGS. 12 and 17, can be used if required to act as a pre-filter or as an after-filter to drain coalesced liquids. This layer or sleeve can be an open pore plastic or metal foam or a layer or layers of non-woven material such as felt. As a further alternative the filter element can be dip sealed into end caps as shown in FIG. 6 of the aforesaid prior patent. FIG. 18 shows an arrangement similar to FIG. 15 with an internal supporting spring 24 in place of any inside support sheet.

Filters made in accordance with the invention can be used for either gas or liquid filtration. The efficiency can be as high as 99.99998% when tested to BS 4400 or can be produced with a micron rating in various stages between 1 and 50 microns. A further method of increasing the efficiency of the moulded filter material is by compressing the material while being resin impregnated and cured.

A further material that can be used for the support sheet is a rigid metal foam. The fibres can be moulded directly onto such foam so that they penetrate only so far into the thickness of the foam sheet, but the fine mesh screen 44 can be eliminated in this process because the foam sheet itself provides the filter surface through which the water is drained. The same method can be used in the case of the aforesaid sintered support sheet. The same method can also be used with foam consisting of plastics material, which may be flexible or semi-rigid. However, very advantageously a rigid polyvinyl chloride coated plastic foam can be used.

Among the many possible uses of the filter according to the invention are the removal of oil from compressed air, pre-filtration, aeration, vacuum filtration, liquid filtration, air sterilization and for pneumatic silencing.

We claim:

1. A method of forming a tubular filter element comprising the steps of forming a slurry of fibers in a liquid, introducing said slurry into the top of an annular molding space defined between a central core, a vertical cylindrical screen spaced from and outward of said core, and an annular screen which extends between the bottom of said cylindrical screen and said core, applying positive pressure to the upper surface of said slurry while said slurry is being introduced into said molding space said pressure applied to the slurry being introduced into said molding space being effective to compact a mass of said fibers on said annular screen and to aid the discharge of said liquid from said molding space through said screens, progressively increasing the height of the effective open area of said cylindrical screen by moving upwardly a sleeve in sliding contact with said cylindrical screen at a rate substantially equal to the rate at which the height of said mass fibers increases above said annular screen, removing said mass from said molding space, and bonding said fibers together.

2. A method according to claim 1, in which said step of applying pressure to said slurry is effected by applying compressed gas to the upper surface of said slurry.

3. A method according to claim 1, in which said liquid is acidified water, said method further including the step of drying said collected mass of fibers prior to its removal from said molding space.

4. A method according to claim 2, in which said slurry is formed by dispersing fibers in water in a blending tank by means of an agitator, the method including pumping said slurry into a pressure vessel, applying said compressed gas to said slurry in said pressure vessel to force said slurry into said molding space, maintaining the application of said compressed gas after said liquid has drained through said screens so as to dry said mass of fibers, and returning said drained water to said blending tank.

5. A method according to claim 1 in which the pressure which is applied while said slurry is being introduced into said container means causes the majority of said fibers to be disposed in said mass substantially parallel with one another.

6. A method according to claim 1 in which a perforated substantially rigid sheet is mounted in said molding space to cover and lie in contact with said cylindrical screen, said applied pressure causing said liquid to drain through said cylindrical screen and through said perforated sheet while said fibers collect in a mass retained by said screen with some of the fibers filling the perforations in said perforated sheet, whereby said removal of said mass results in the removal of said perforated sheet therewith, said perforated sheet being selected and located to provide a support for the bonded fiber mass on a surface of the filter element through which a fluid filtered by the filter element is to pass.

7. A method according to claim 1 in which said slurry comprises fibers mixed with water in the ratio by weight of between 0.01% to 0.5% fibers to water, the pH value of the slurry being adjusted to a value of 2.8 to 3.5.

8. The method of claim 1 wherein said step of applying pressure to said slurry is effected by a hydraulic pump.

9. The method of claim 1 wherein said central core is liquid impervious.

10. The method of claim 1 wherein said bonding step constitutes bonding said fibers together by a synthetic resin.

11. A method according to claim 10, in which said fibres are borosilicate fibres and said synthetic resin is a silicone resin.

12. A method according to claim 10, in which said fibres are constituted by a combination of cellulose fibres and borosilicate fibres and said synthetic resin is melamine resin.

13. A method according to claim 10, in which said fibres are constituted by a combination of cellulose fibres and borosilicate fibres and said synthetic resin is a phenolic resin.

14. A method of forming a filter element comprising the steps of forming a slurry comprising fibers in a liquid, introducing said slurry into the top of a container comprising an open-topped vertical cylindrical space defined between a vertically oriented first core, a cylindrical fine mesh screen surrounding said core in outwardly spaced relation thereto, and an annular fine mesh screen extending across the bottom of said vertical cylindrical space, said cylindrical fine mesh screen being so arranged that the slurry in said cylindrical space presents a surface free to receive applied pressure, applying pressure to said slurry surface whereby said liquid drains through said screens while said fibers collect in said cylindrical space in a tubular mass retained by said screens with the majority of said fibers disposed approximately in parallel with one another, replacing said first core by a second vertically oriented core of lesser cross-section thereby to leave a gap between said tubular mass and said second core, adding a layer of fibers to said tubular mass by introducing into said gap a further slurry containing fibers different from said first-mentioned slurry and applying pressure to the top of said further slurry in said gap whereby the liquid in said further slurry drains through said tubular mass and said screens, removing said tubular mass and added layer from said container, and bonding said fibers together by a synthetic resin.

15. A method of forming a tubular filter element comprising the steps of mixing a slurry comprising fibers in a liquid, introducing said slurry into the top of an annular molding space, said molding space having an annular bottom which is liquid pervious and a vertical cylindrical side wall which is pervious to liquid over its effective open area, the effective open area of said cylindrical side wall being adapted to be varied by an imperforate cylindrical sleeve mounted in close sliding contact with said liquid pervious cylindrical side wall, said slurry presenting a surface which is free to receive applied pressure, applying pressure to said slurry surface whereby said liquid drains through said liquid pervious annular bottom and through the effective open area of said liquid pervious cylindrical side wall while fibers collect in a mass of increasing height upwardly from the bottom of said annular molding space, slidably moving said imperforate cylindrical sleeve upwardly to increase the available open area of said liquid pervious cylindrical side wall at a controlled rate as said fiber mass increases in height in said annular molding space, and removing said fiber mass from said molding space after said fibers have accumulated to a mass of desired height.

* * * * *